US006601463B2

(12) United States Patent
Paslay

(10) Patent No.: US 6,601,463 B2
(45) Date of Patent: Aug. 5, 2003

(54) DEVICE FOR DETERMINING A LEVEL OF OBJECTS IN A HOPPER

(75) Inventor: David Paslay, Moro, IL (US)

(73) Assignee: Coin Acceptors, Inc., St. Louis, MO (US)

( * ) Notice: Subject to any disclaimer, the term of this patent is extended or adjusted under 35 U.S.C. 154(b) by 0 days.

(21) Appl. No.: 10/038,247

(22) Filed: Jan. 3, 2002

(65) Prior Publication Data

US 2003/0121326 A1 Jul. 3, 2003

(51) Int. Cl.[7] .................................................. G01N 1/00
(52) U.S. Cl. ............................................ 73/863; 73/149
(58) Field of Search ..................... 73/149, 861, 861.02, 73/863, 304 R

(56) References Cited

U.S. PATENT DOCUMENTS 4,667,503 A * 5/1987 Loos ............................... 73/3
5,564,546 A * 10/1996 Molbak et al. ............. 194/216
5,620,079 A * 4/1997 Molbak ....................... 194/217
5,944,162 A 8/1999 Filiberti ....................... 194/204
6,168,001 B1 * 1/2001 Davis ......................... 194/200
6,176,774 B1 1/2001 Filiberti et al. ............... 453/32

* cited by examiner

*Primary Examiner*—Helen Kwok
*Assistant Examiner*—Rodney Frank
(74) *Attorney, Agent, or Firm*—Polster, Lieder, Woodruff, & Lucchesi, L.C.

(57) ABSTRACT

A device for determining a level of objects in a hopper comprises a hopper for storing and dispensing objects, a pair of sensors positioned within the hopper for sensing one or more of the objects within the hopper, and a processor connected to the pair of sensors for receiving signals indicative of the pair of sensors sensing one or more of the objects, the processor for determining the level of objects within the hopper based upon tracking a trend in the signals.

18 Claims, 9 Drawing Sheets

DEVICE FOR DETERMINING A LEVEL OF OBJECTS IN A HOPPER

BACKGROUND OF THE INVENTION

This invention relates to a hopper used to collect, store, and dispense objects, such as coins, and more particularly, to a device for determining a level of objects in the hopper.

Hoppers are used to collect, store, and distribute or dispense objects from the hopper. It is important to be able to determine a level, such as a low level, of objects in the hopper. For example, the hopper may be initially filled with objects for temporary storage therein and once objects are ejected or dispensed it may be necessary to know when the hopper is approaching an empty condition to be able to refill the hopper. Associated with a hopper is a dispensing or delivery mechanism that may be actuated by a motor. Movement of the delivery mechanism moves the objects within the hopper to direct the objects toward an ejection slot or door to eject one of the objects. One method for determining a level of objects within a hopper is to simply count the objects as the objects are ejected. However, with this method too many parameters would have to be known. In particular, factors such as the total maximum number of objects that can be held in the hopper and the initial number of objects in the hopper would always have to be known for such a system to function properly. Further, due to the random nature in which objects are positioned within a hopper, the initial number of objects may not always be the same. Another method that may be employed is to weigh the objects in the hopper. However, adding a weighing device or mechanism to a hopper may not be suitable or desirable. A further method may entail using a photo detector device that becomes unblocked when the number of objects is below a certain predetermined level. However, this method may not be accurate due to the random configuration of objects lying in the hopper. Additionally, an object may stick to the side of the hopper blocking the detector that would falsely indicate that the hopper is still full.

Accordingly, it is desirable and advantageous to provide a device for determining a level of objects in a hopper which is accurate and independent upon any initial conditions. The present invention is designed to track trends in sensor measurements dependent upon objects within the hopper in order to accurately predict a low level condition of objects in the hopper. In particular, the present invention accomplishes level detection by employing a sensor pair that provides signals to a control device for the control device to determine the level of objects within the hopper. The present invention also accomplishes level detection by employing a sensor which detects a successful ejection of an object from a hopper and based upon this is able to determine the level of objects within the hopper.

SUMMARY OF THE INVENTION

In one form of the present invention, a device for determining a level of objects in a hopper comprises a hopper for storing and dispensing objects, a pair of sensors positioned within the hopper for sensing one or more of the objects within the hopper, and a processor connected to the pair of sensors for receiving signals indicative of the pair of sensors sensing one or more of the objects, the processor for determining the level of objects within the hopper based upon tracking a trend in the signals.

In another form of the present invention, a device for determining a level of objects in a hopper comprises a hopper for storing and dispensing objects, a delivery mechanism for dispensing an object from the hopper, a sensor for detecting when an object has been dispensed from the hopper by the delivery mechanism; an a processor connected to the delivery mechanism and the sensor for determining a number of deliveries per delivery attempted by the delivery mechanism.

In yet another form of the present invention, a device for determining a level of objects in a hopper comprises a hopper for storing and dispensing objects, a delivery mechanism for dispensing an object from the hopper, the delivery mechanism having a motor, and a processor connected to the motor for sensing current drawn by the motor as the delivery mechanism dispenses an object from the hopper.

In still another form of the present invention, a device for determining a level of objects in a hopper comprises a hopper for storing and dispensing objects, a pair of sensors positioned within the hopper for sensing one or more of the objects within the hopper, a delivery mechanism for dispensing an object from the hopper, the delivery mechanism having a motor, a sensor for detecting when an object has been dispensed from the hopper by the delivery mechanism, and a processor connected to the pair of sensors for receiving signals indicative of the pair of sensors sensing one or more of the objects, the processor for determining the level of objects within the hopper based upon tracking a trend in the signals, the processor further connected to the delivery mechanism and the sensor for determining a number of deliveries per delivery attempted by the delivery mechanism, and the processor connected to the motor for sensing current drawn by the motor as the delivery mechanism dispenses an object from the hopper.

Accordingly, it will be recognized that an object of the present invention is to provide a device for determining a level of objects in a hopper.

A further object of the present invention is to provide a device for determining a level of objects in a hopper which is of simple construction and design and which can be easily employed with highly reliable results.

Another object of the present invention is to provide a device for determining a level of objects in a hopper which can determine when the hopper is approaching an empty condition.

A further object of the present invention is to provide a device for determining a level of objects in a hopper which is designed to track trends in sensor measurements dependent upon objects within the hopper in order to accurately predict a low level condition of objects in the hopper.

It is a further object of the present invention is to provide a device for determining a level of objects in a hopper which employs a sensor pair that provides signals to a control device for the control device to determine the level of objects within the hopper.

A still further object of the present invention is to provide a device for determining a level of objects in a hopper which tracks trends in current draw of a motor in order to predict the occurrence of a low level condition of objects in the hopper.

Another object of the present invention is to provide a device for determining a level of objects in a hopper which accurately predicts the occurrence of a low level condition.

A further object of the present invention is to provide a device for determining a level of objects in a hopper which tracks the number of delivered objects versus the number of delivery attempts in order to predict the occurrence of a low level condition in the hopper.

It is another object of the present invention is to provide a device for determining a level of objects in a hopper which employs one or more methods in order to yield a more accurate prediction of the occurrence of a low level of objects in a hopper.

These and other objects and advantages of the present invention will become apparent after considering the following detailed specification in conjunction with the accompanying drawings, wherein:

DETAILED DESCRIPTION OF THE PREFERRED EMBODIMENTS

Figure 1:
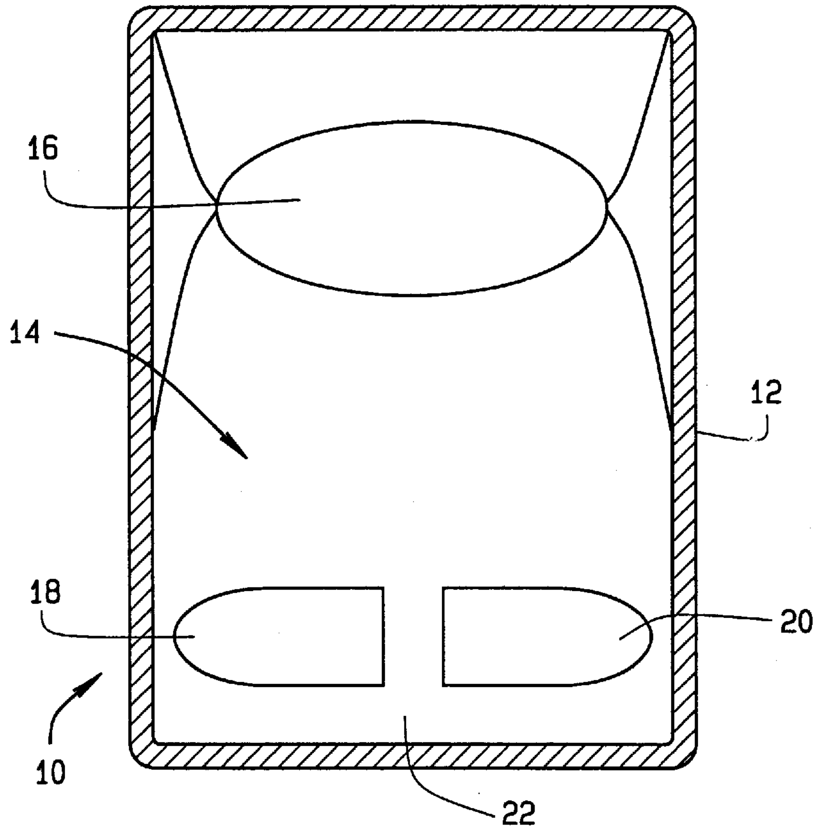
FIG. 1 is a top view of a preferred embodiment of a device for determining a level of objects in a hopper constructed according to the present invention.

Referring now to the drawings, wherein like numbers refer to like items, number 10 identifies a preferred embodiment of a device for determining a level of objects in a hopper constructed according to the present invention. With reference now to FIG. 1, the device 10 is shown comprising a hopper 12 having a hopper basin 14 in which objects such as coins (not shown) are stored and an ejection slot or object exit 16 from which objects in the basin 14 are ejected or dispensed. To deliver an object, such as a coin, from the hopper 12, a motor (not shown) is used to turn a ring (not shown) within the basin 14, which feeds an object down to a mechanism that captures and forces an object out of the exit 16. The ring is also used to agitate other objects remaining in the basin 14 in an attempt to direct the objects toward or into the ring and to capture one of the objects. The basin 14 further includes a pair of sensors 18 and 20 positioned at a bottom 22 of the basin 14 which are used to determine the level of objects within the basin 14. The bottom 22 is sloped down toward the exit 16 and this also facilitates movement of the objects toward the exit 16 and the ring. The sensors 18 and 20 may be spaced apart and opposed to each other. An example of the sensors 18 and 20 may be an optical pair that comprises an emitter portion and a detector portion. If an object in the basin 14 blocks the sensor pair 18 and 20, this will be interpreted as inactive and if there is no object blocking the sensor pair 18 and 20 this will be determined as active. Another example of a pair of sensors 18 and 20 is a pair of conducting contact pads. If the objects in the basin 14 are electrically conducting then there can be a circuit completed through the pads and one or more of the objects.

Figure 2:
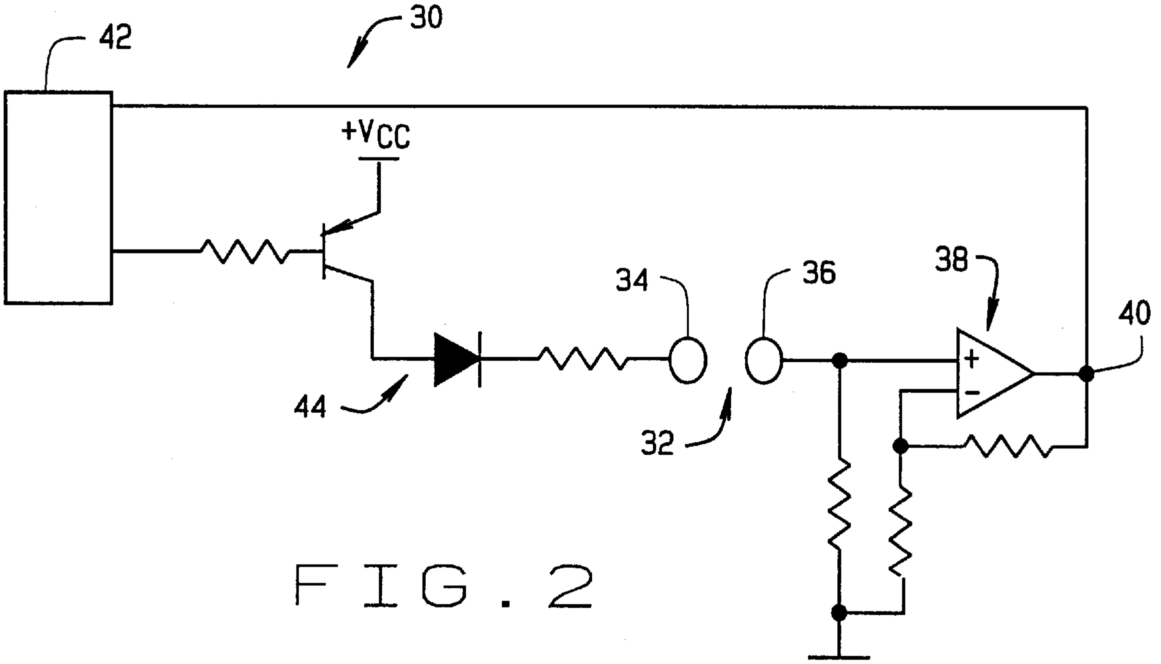
FIG. 2 is a partial schematic and block diagram of a circuit employed in the device of the present invention.

With reference now to FIG. 2, a circuit 30 for determining the level of objects within the hopper 12 is shown. The circuit 30 has a sensor pair 32 consisting of members 34 and 36 that may correspond to the sensor pair 18 and 20 illustrated in FIG. 1. The member 34 is stimulated with a voltage and the member 36 is connected to a signal conditioning circuit 38. An output of the circuit 38 is taken as a node 40 and is sent to a device 42, such as a control circuit, a microcontroller, or a microprocessor, which collects and analyzes data from the sensor pair 32. The device 42 also provides a signal to a circuit 44 that provides the voltage to stimulate the member 34. When an object, such as a coin, touches both of the members 34 and 36 of the sensor pair 32, an electrical circuit is completed between the members 34 and 36. If the sensor pair 32 is an optical pair, then an object may block the sensor pair 32 and an appropriate signal will be generated or produced by the circuit 38. A signal may be produced by the conditioning circuit 38 and is provided to the device 42 from the node 40. This signal is indicative of an inactive status of the sensor pair 32. When no signal is produced by the conditioning circuit 38 this is indicative of an active status of the sensor pair 32. A change from active to inactive or vice versa is a transition of the sensor pair 32 and this may occur many times during the delivery of objects into the hopper 12 or the emptying of objects from the hopper 12.

Figure 3:
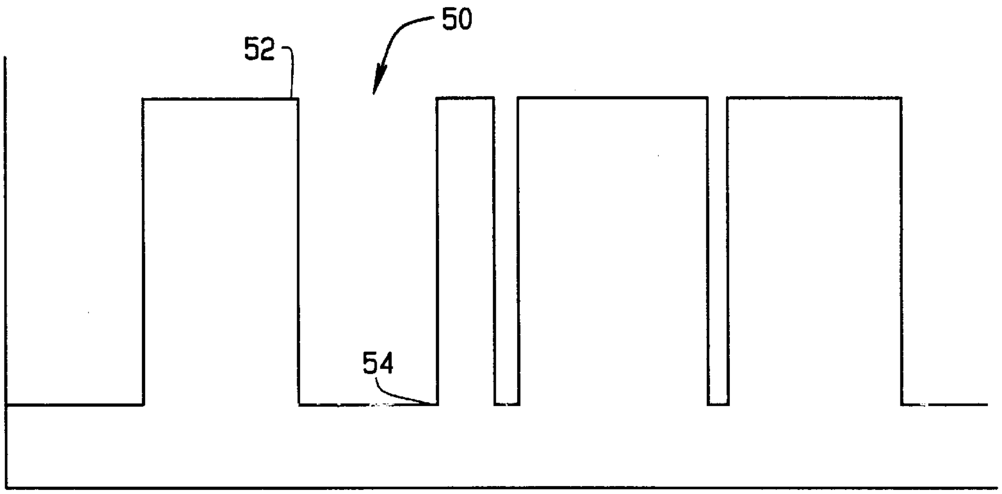
FIG. 3 is a graph of an output from the circuit shown in FIG. 2.

FIG. 3 is an illustration of a graph of a signal 50 taken at the node 40 that is provided to the device 42. If the signal 50 is greater than a set threshold then the reading or signal is considered to be high. If the signal 50 is less than the threshold then the reading or signal is considered to be low. By sampling the signal 50 at a high rate or using an edge detection technique, the device 42 can count the number of times during the delivery that the signal 50 transitions or changes from high to low or low to high. For example, at a point 52 the signal 50 transitions from high to low and at a point 54 the signal 50 changes from a low state to a high state. As will be described further herein, with this information, the device 42 is capable of determining the level of objects within the hopper 12.

Figure 4:
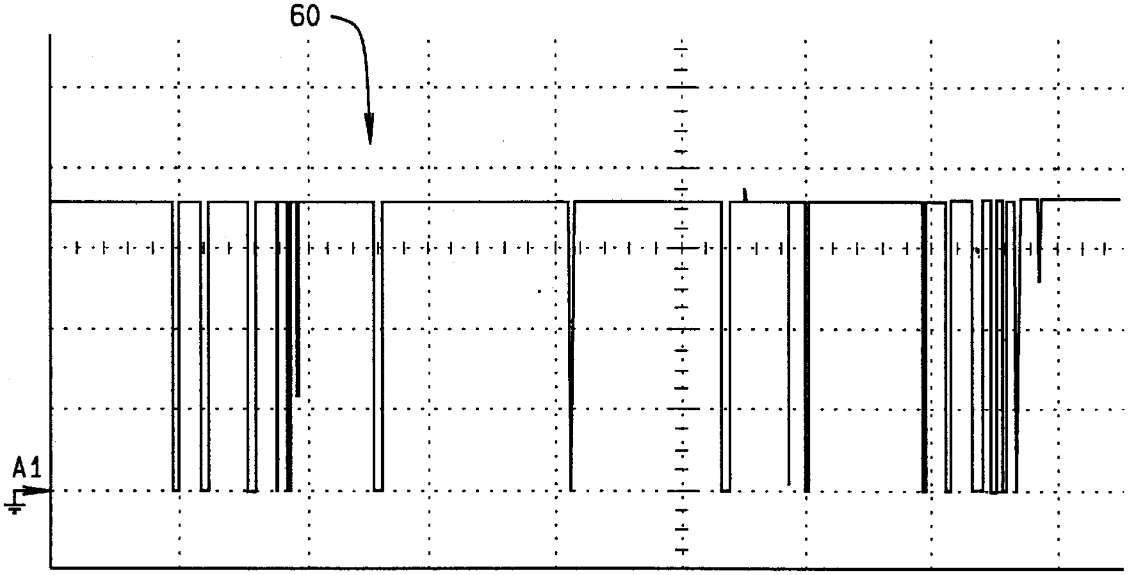
FIG. 4 is a graph of another possible output from the circuit shown in FIG. 2.
Figure 5:
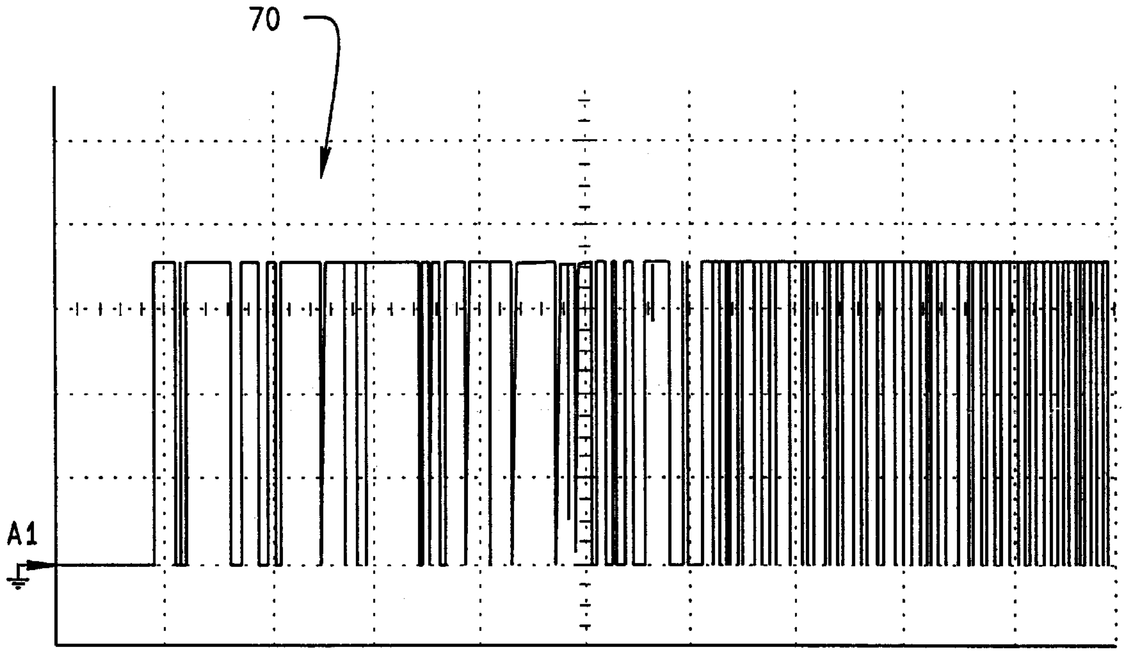
FIG. 5 is a graph of still another possible output from the circuit shown in FIG. 2.

Referring now to FIG. 4, a graph of a signal 60 taken at the node 40 is shown which is indicative of many objects being in the hopper 12. FIG. 5 illustrates a graph of a signal 70 which is taken at the node 40. The signal 70 is indicative of few objects being in the hopper 12. The signal 70 may be a filtered output. A comparison between the signals 60 and 70 indicates that there are more transitions with fewer objects in the hopper 12. The waveform or signal 60 is due to there being more weight on top of the objects resting in the bottom 22 of the hopper 12. With more weight, the objects positioned at the bottom 22 of the hopper 12 do not move around and therefore do not change the level of the sensor pair 32. When there are fewer objects in the hopper 12, the objects tend to bounce around or move more resulting in more transitions. The device 42 collects data by monitoring the signals 60 or 70 over several iterations of delivering objects into the hopper 12 and emptying objects from the hopper 12. A sharp drop in the number of transitions follows the increase in transitions due to the objects not being able to reach or interact with the sensor pair 32.

Figure 6:
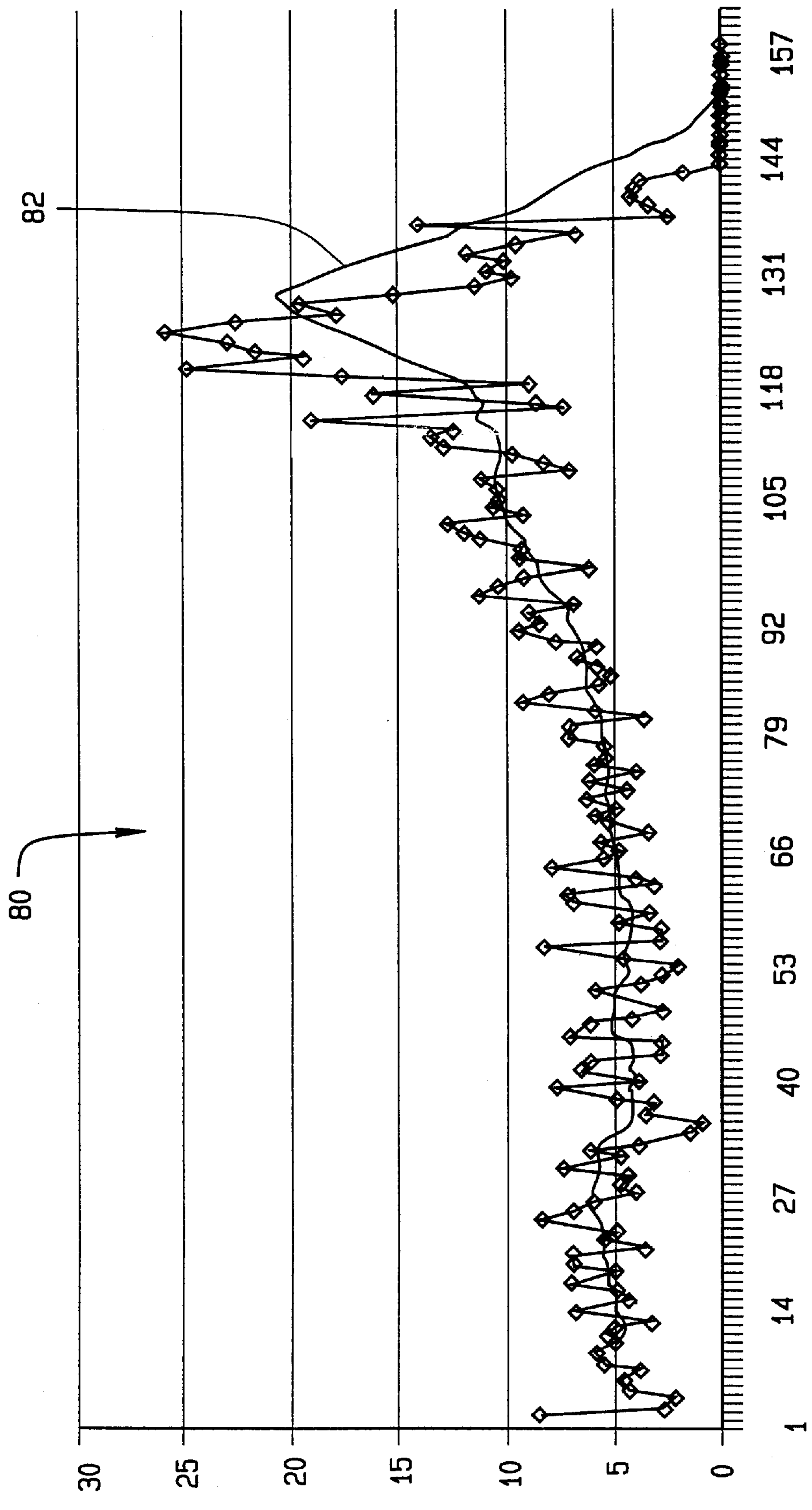
FIG. 6 is a plot of data collected from and based upon an output from the circuit shown in FIG. 2.

With reference now to FIG. 6, a plot 80 of data collected from signals, such as the signals 60 or 70 that are provided to the device 42, representative of the delivery of objects into the hopper 12 from a full state to an empty state is shown. It is to be assumed that 160 objects constitute a full hopper 12. It appears that a rise in the plot 80 occurs with the dispensing of the 79th object out of the hopper 12. A peak of the plot 80 occurs at about the removal of the 130th object from the hopper 12. Finally, a sharp drop in the plot 80 appears when about approximately 15 objects are left in the hopper 12. Every time an object is dispensed out of the hopper 12 the number of transitions within a signal provided from the output of the circuit 38 at the node 40 (see FIG. 2) is stored in a circular buffer in the device 42. An average over the whole buffer is calculated. A trend line 82 depicted in FIG. 6 indicates a 10-point moving average. An algorithm or program stored within the device 42 is used to determine when the value of this moving average transitions with a minimum negative slope to determine the low level condition.

While the average of this transition data over many loads into the hopper 12 may show a consistent trend, there may be occasions when a false low level condition is found or indicated. These transitions are high frequency transitions, meaning that the widths of the pulses are of small time duration. In addition to this high frequency transition information there are also low frequency transitions. The high frequency transitions occur from edges of the objects momentarily causing the sensor pair 32 to become active or inactive. Low frequency transitions occur from a mass of objects being present or not present between the opposing sensors 34 and 36.

Figure 7:
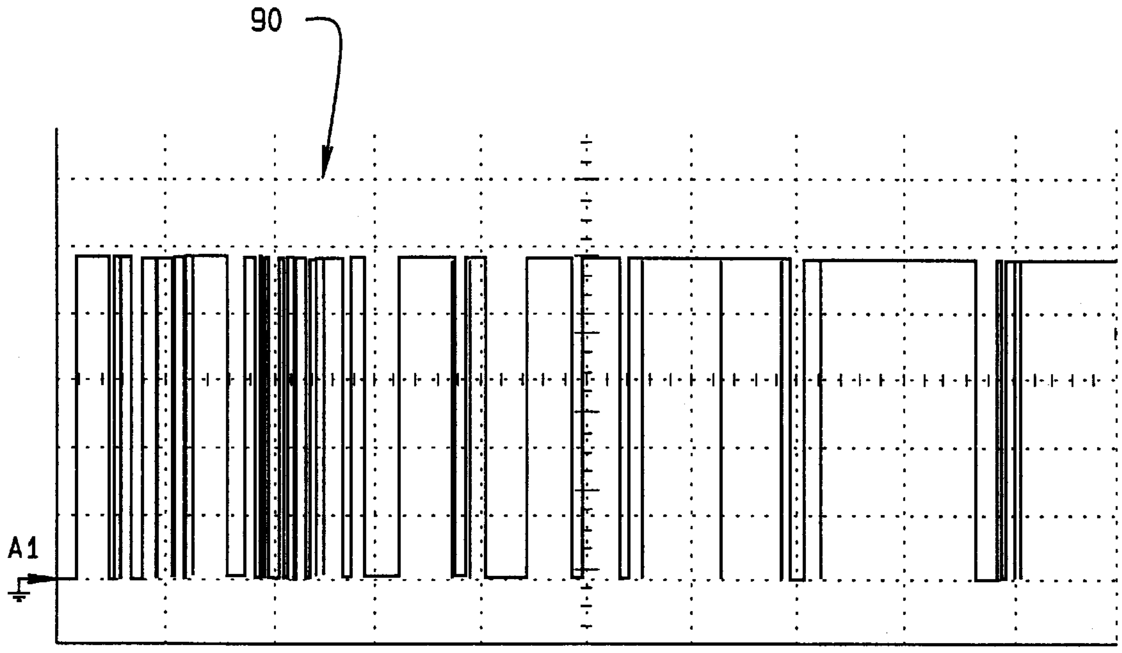
FIG. 7 is a graph of an output from the circuit shown in FIG. 2.

FIG. 7 shows an expanded waveform 90 of this condition. Both the low frequency transitions and the high frequency transitions can be seen. In the waveform 90, the high frequency transitions appear as noise on the edges of the low frequency transitions. Using a method of filtering out these transitions, the low frequency data can be extracted. Depending upon the shape of the objects in the hopper 12, the high frequency transitions can predict an emptying of the hopper 12. Further, the low frequency transitions indicate that most of the time there is still a mass of objects in the hopper 12. In other words, when there is agitation of the objects in the hopper 12, edges are passing by the sensors 34 and 36 rapidly and the sensor pair 32 remains active or inactive. The level of the sensor pair 32 is another bit of information that can be used by the device 42 to distinguish between a random occurrence and an emptying of the hopper 12. Besides counting transitions, the actual state of the sensor pair 32, active or inactive, provides information about the objects in the hopper 12.

Figure 8:
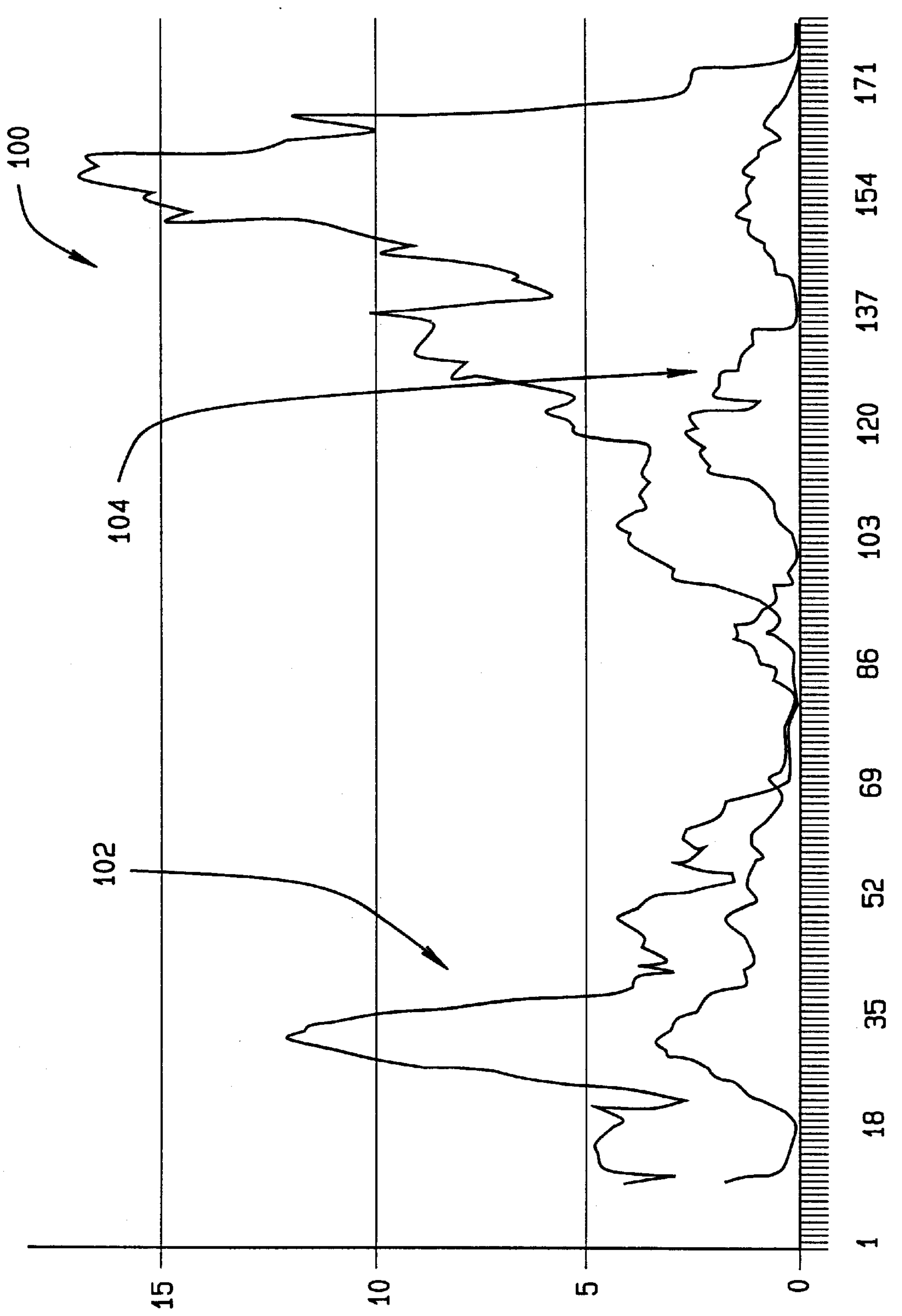
FIG. 8 is a graph of a low level sensor trend data.
Figure 9:
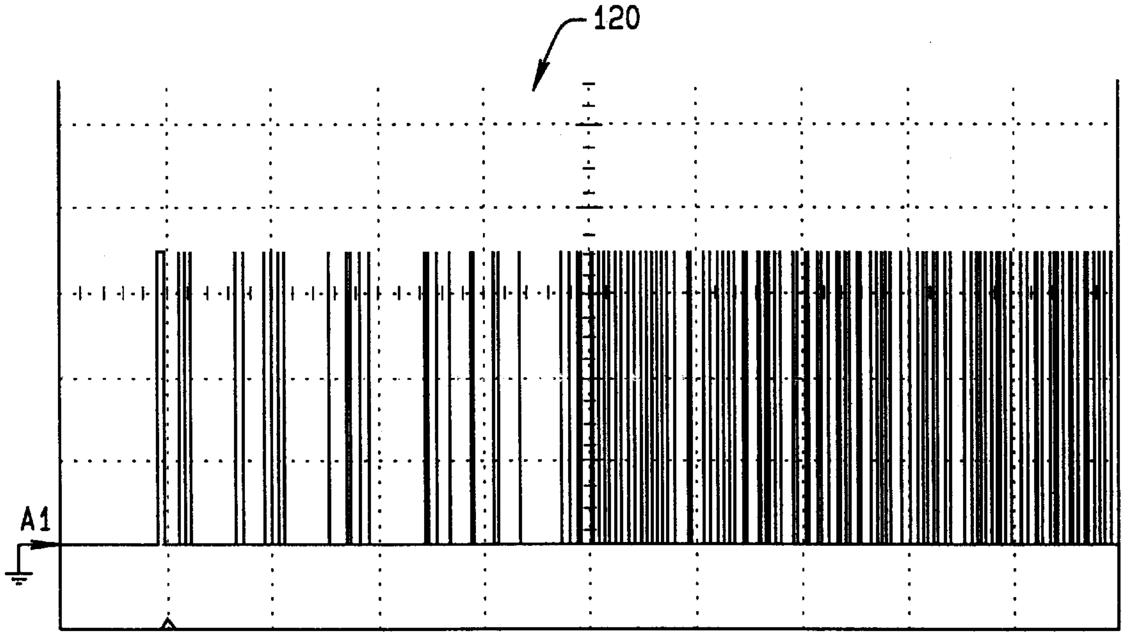
FIG. 9 is a graph of a filtered output from the circuit shown in FIG. 2.

FIG. 8 depicts a graph 100 of the low level sensor trend data. A high frequency trace 102 is shown in the graph 100 and the trace 102 has a rise in sensor transitions around the delivery of the $25^{th}$ object from the hopper. A low frequency trace 104 is also shown in the graph 100. The low frequency trace 104 shows a rise indicating that there may be a low level condition. Since it is known that there is a capacity of 180 objects in the hopper this cannot truly be a low level condition. The distinguishing factor between this false low level condition and the true low level condition is the low frequency state of the sensor. Referring again to FIG. 5, the waveform 70 has a filtered state of active. This indicates that objects are generally present in the hopper. The waveform 70 is an example of what the signal would look like for the false low level condition. With reference now to FIG. 9, a waveform 120 is shown that has a filtered state of inactive. This indicates that objects are generally not present in the hopper. The waveform 120 is an example of what the signal would look like around the delivery of the $150^{th}$ object from the hopper or the true low level condition in the hopper.

The device 42, as previously described, may include a microprocessor, program memory which stores a program for controlling the device 42, and memory for storing data incident to execution of the program and data representative of the output signals taken at the node 40. With data stored in the device 42, the device 42 is capable of determining the level of objects within the hopper 12. This is accomplished by tracking the information that has been stored. This information may include tracking the number of transitions in the sensor pair 32 while exercising the delivery mechanism and the actual level of the sensor pair 32 reveals trends in the data as the hopper 12 empties.

Figure 10:
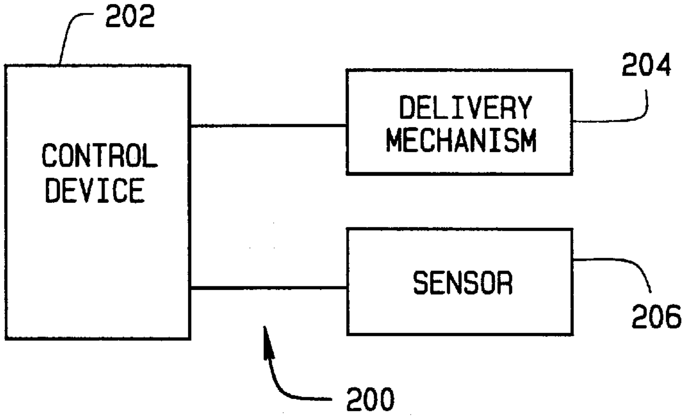
FIG. 10 is a block diagram of another preferred embodiment of a device for determining a level of objects in a hopper constructed according to the present invention.

FIG. 10 illustrates another embodiment of a device 200 for detecting a level of objects in a hopper constructed according to the present invention. The device 200 includes a control device 202, such as a microprocessor, a microcontroller, or other similar control circuit, which is connected to a delivery mechanism 204 and a sensor 206. The delivery mechanism 204 is partially within a hopper (not shown) and is used to agitate objects within the hopper, capture an object within the hopper, and dispense or remove the object from the hopper. The sensor 206 is used to detect whether an object has been successfully removed or delivered from within the hopper. Examples of the sensor 206 include photodetectors, coils, other electronic sensors, and mechanical type sensors. Each time the delivery mechanism 204 is activated by the control device 202, this is considered to be a delivery attempt. Due to the random nature of the objects within the hopper, an object may not be dispensed every time the delivery mechanism 204 is activated. The sensor 206 is positioned beneath the hopper or the delivery mechanism 204 to verify or detect that an object has been dispensed from the hopper. Tracking the number of delivery attempts that occur, per object dispensed, reveals an increase in delivery attempts as the hopper is emptied of objects. Each time an object is dispensed, the number of delivery attempts it takes to dispense the object is stored in a circular buffer in the control device 202. When the average over this buffer is trending upward with a certain slope, the hopper is near empty and the low level condition is detected.

Figure 11:
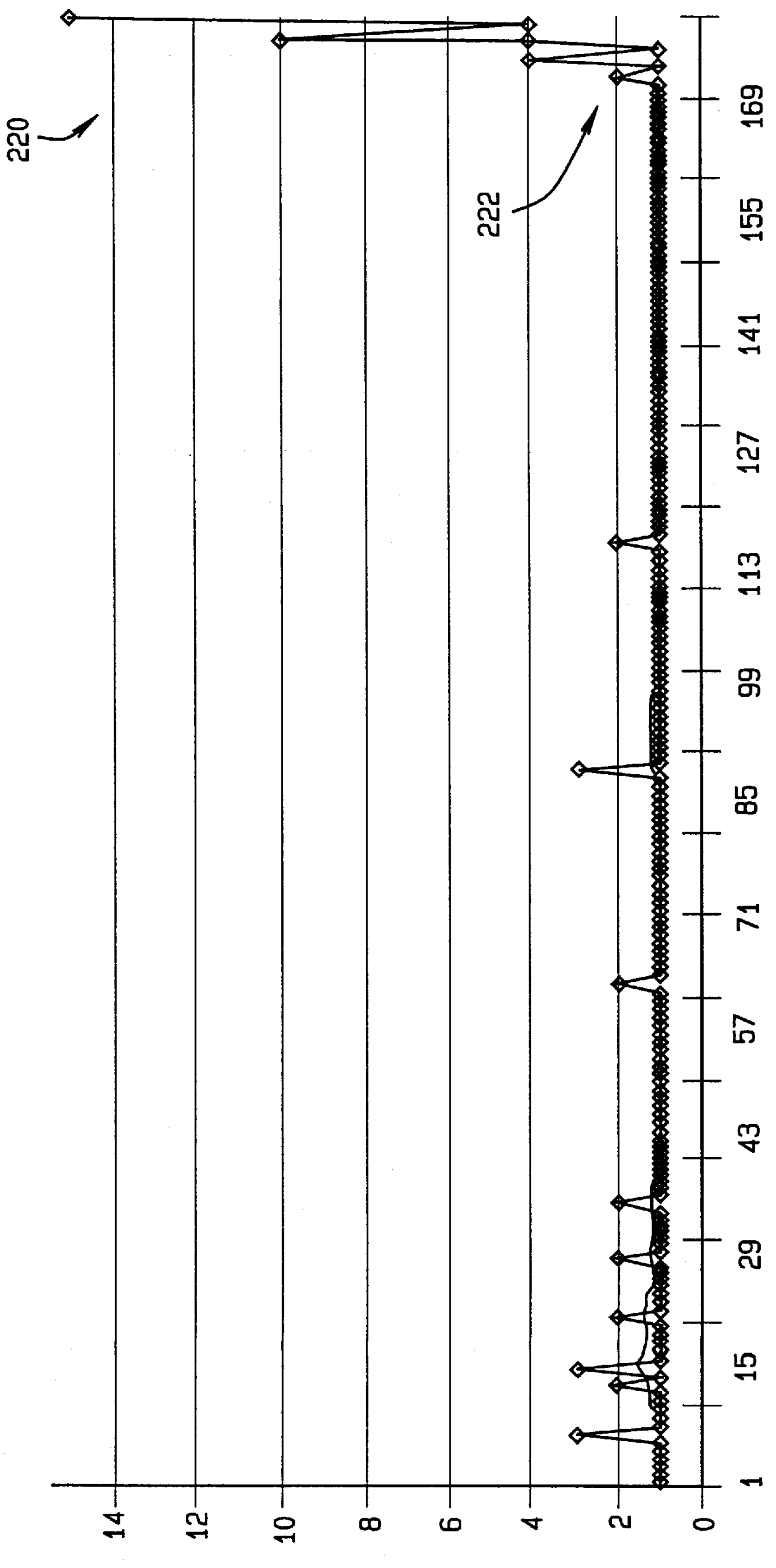
FIG. 11 is a graph representative of a number of full-to-empty hopper iterations.

With reference now to FIG. 11, a graph of data 220, which is representative of a number of full-to-empty hopper iterations, is shown. Assuming that 180 objects constitute a full hopper, the slope of the graph of data 220 begins to rise sharply with approximately 10 objects remaining in the hopper. This is indicated at a location 222 on the graph of data 220. Also, there is a slight rise and fall at the beginning of the graph of data 220. This is due to hand loading of the objects in the hopper. When the objects are first dumped into the hopper, the objects have not had time to line up in the hopper for dispensing. It takes a few more delivery attempts at the beginning to dispense an object. The control device 202 may be programmed to determine when the slope of the graph 220 begins to rise sharply and this will be indicative of a low level condition within the hopper.

Figure 12:
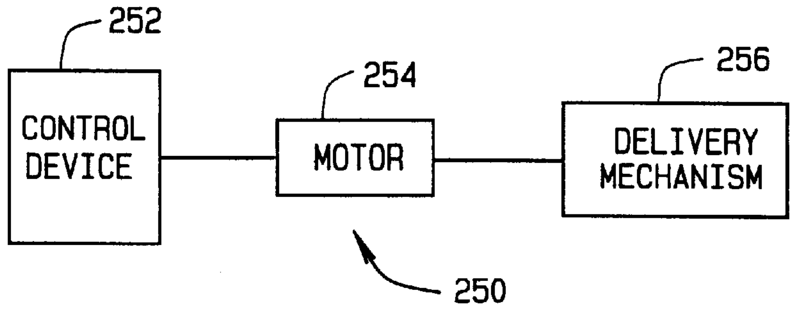
FIG. 12 is a block diagram of another preferred embodiment of a device for determining a level of objects in a hopper constructed according to the present invention.
Figure 13:
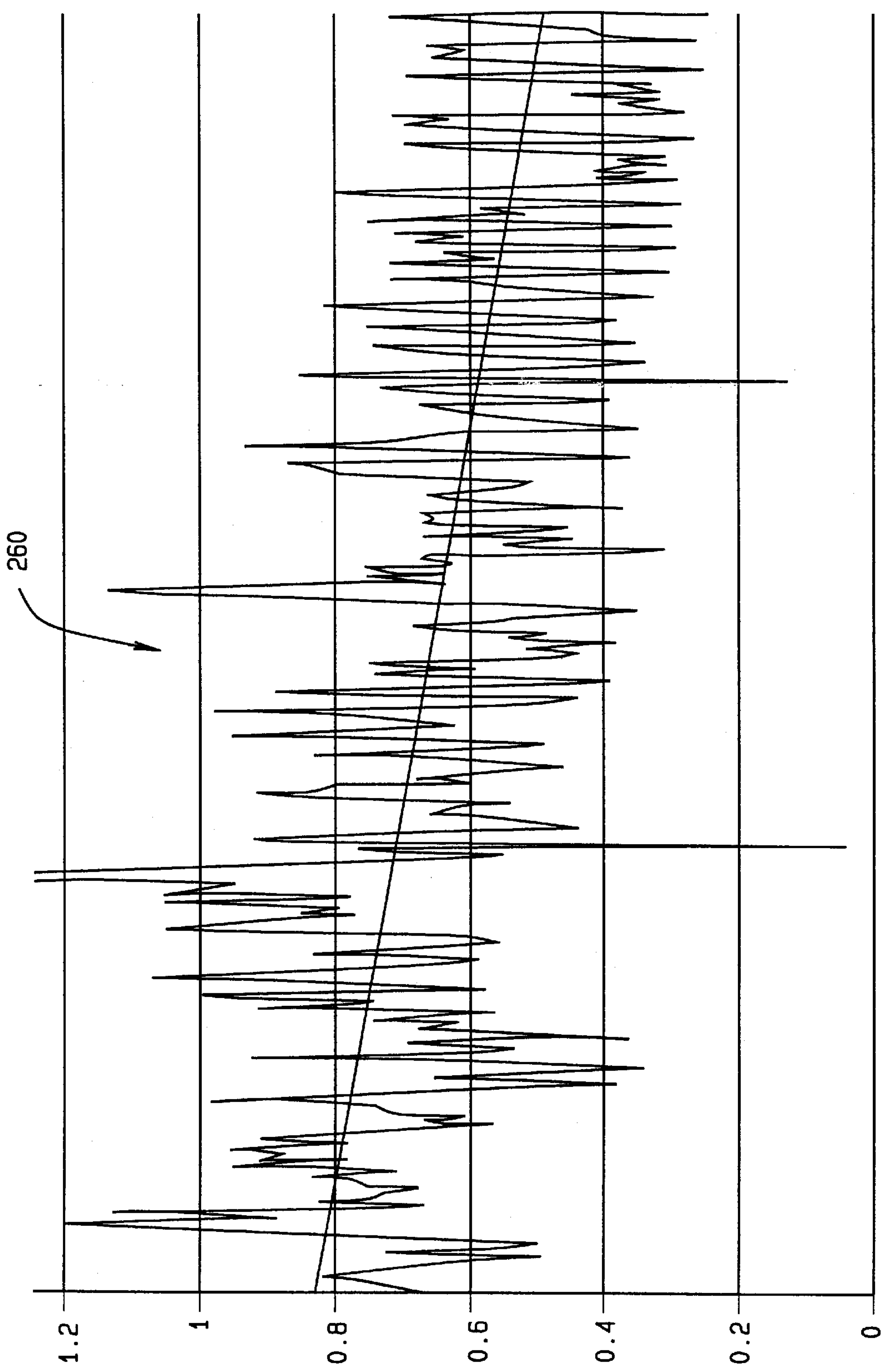
FIG. 13 is a graph of average current versus a number of deliveries.

FIG. 12 shows another embodiment of a device 250 for detecting a level of objects in a hopper constructed according to the present invention. The device 250 includes a control device 252, such as a microprocessor, a microcontroller, or other similar control circuit, which is connected to a motor 254 which operates a delivery mechanism 256. The delivery mechanism 256 is partially within a hopper (not shown) and is used to agitate objects within the hopper, capture an object within the hopper, and dispense or remove the object from the hopper. The control device 252 is used to monitor the current draw of the motor 254 during dispensing of an object from the hopper. For each delivery attempt, an average of the current required to make that attempt is calculated and stored in the control device 252. With many objects in the hopper, on average, it takes more current to deliver objects. It also takes a widely varying range of current for each delivery. As the objects in the hopper are dispensed from full to empty, the average current supplied to the motor 254 trends downward approaching the freerunning current of the motor 254. FIG. 13 illustrates a graph 260 of average current versus number of deliveries. It is assumed that the hopper is capable of holding 200 objects. As fewer objects remain in the hopper the average current begins to settle and vary less with each delivery attempt. This is due to fewer objects remaining in the hopper and the delivery mechanism 256 no longer having to displace many objects to make a delivery attempt. With a full hopper, the delivery mechanism 256 has a heavy load and has to displace the entire hopper full of objects. The graph 260 also shows the decline in current for a hopper loaded with 200 objects. As the graph 260 illustrates, the current trends downward and variations in the signal begin to settle as the hopper is emptied of the objects. The control device 252 may be programmed to determine when the current trends downward and the signal begins to settle to indicate that a low level or number of objects remain within the hopper.

Figure 14:
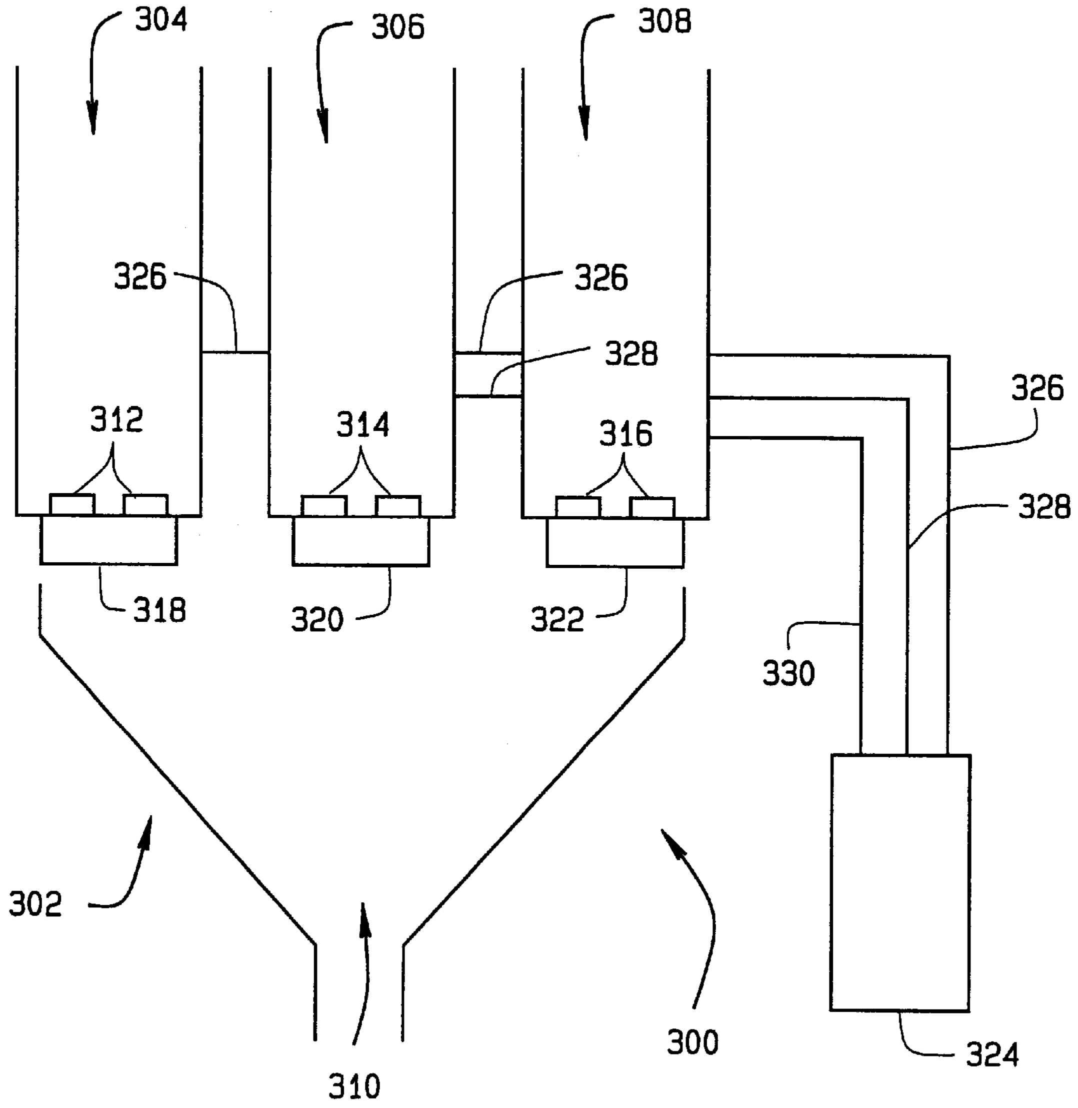
FIG. 14 is a partial block and schematic diagram of preferred embodiment of a device for determining a level of objects in a hopper constructed according to the present invention.

Referring now to FIG. 14, another embodiment of a device 300 for determining a level of objects in a hopper is illustrated. The device 300 is incorporated within a coin changer device 302. The coin changer device 302 is capable of authenticating coins inserted into a vending machine (not shown) and assuming the coins are authentic, directing the coins to either an appropriate hopper 304, 306, or 308 or to a cash box (not shown) for storage. The hopper 304 may be used to capture and store coins of a single denomination, such as quarters, directed into the hopper 304. The hopper 306 is capable of storing coins, such as nickels, and the hopper 308 may be used to store dimes. As coins are paid out of the hoppers 304, 306, or 308 as change provided back to a customer, it is necessary to know when the hoppers 304, 306, and 308 are becoming low or close to empty in order to determine how best to provide change or to indicate that exact change must be inserted into the vending machine. For example, if the hopper 304 of quarters is low, then it may be best to start paying out or dispensing two dimes and a nickel instead of a quarter. The coin changer device 302 includes a coin payback chute 310 which directs coins dispensed from the hoppers 304, 306, or 308 to a coin return cup (not shown) associated with the vending machine.

Each of the hoppers 304, 306, and 308 has a pair of sensors 312, 314, and 316, respectively, which are similar to the sensors 18 and 20 shown in FIG. 1. Further, each of the hoppers 304, 306, and 308 have a delivery mechanism 318, 320, and 322 associated therewith. Although not shown the delivery mechanisms 318, 320, and 322 may include an associated motor, delivery sensor, ring, and ejection slot, as has been previously described. Further, the delivery mechanisms 318, 320, and 322 may be partially within each of the hoppers 304, 306, and 308, respectively. The device 300 further comprises a control device 324 that is operatively connected to the pair of sensors 312–316 and the delivery mechanisms 318–322. In particular, the sensor pair 312 and the delivery mechanism 318 are connected to the control device 324 via an electrical connection 326. Although a single connection or wire is illustrated, it is to be understood that more than one wire may be used for such connection. The sensor pair 314 and the delivery mechanism 320 are connected to the control device 324 via a connection 328. Additionally, the sensor pair 316 and the delivery mechanism 322 are connected to the control device 324 by a connection 330.

The control device 324 may comprise a microprocessor or microcontroller and one or more circuits similar to the circuit 30 (FIG. 2). In this manner, the control device 324 may be programmed to receive signals from the one or more circuits to evaluate data to determine a level of coins in each of the hoppers 304, 306, and 308. The control device 324 may also evaluate data with respect to the operation of the delivery mechanisms 318–322 and the number of dry deliveries that occur to determine when the hoppers 304–308 are near empty or approaching a low level condition. For example, the device 300 may include a sensor (not shown) associated with each of the delivery mechanisms 318–322 to detect whether an object has been successfully removed or delivered from the hoppers 304–308. Each of the sensors may be similar to the sensor 206 which was shown in FIG. 9. Further, the control device 324 is capable of determining when the average current draw by the motors associated with the delivery mechanisms 318–322 are trending downward to determine the level of coins in each of the hoppers 304–308.

From all that has been said, it will be clear that there has thus been shown and described herein a device for determining a level of objects in a hopper which fulfills the various objects and advantages sought therefor. It will become apparent to those skilled in the art, however, that many changes, modifications, variations, and other uses and applications of the subject device for determining a level of objects in a hopper are possible and contemplated. All changes, modifications, variations, and other uses and applications which do not depart from the spirit and scope of the invention are deemed to be covered by the invention, which is limited only by the claims which follow.

What is claimed is:

1. A device for determining a level of objects in a hopper comprising:

a hopper for storing and dispensing objects;

a pair of sensors positioned within the hopper for sensing one or more of the objects within the hopper; and a processor connected to the pair of sensors for receiving signals indicative of the pair of sensors sensing one or more of the objects, the processor for determining the level of objects within the hopper based upon tracking a trend in the signals, the signals capable of transitioning between high frequency transitions and low frequency transitions and the processor is adapted to determining the trend in the signals based upon the high and low frequency transitions.

2. The device of claim 1 wherein the trend is a moving average which transitions to a minimum negative slope.

3. The device of claim 1 wherein the pair of sensors are either in an active state or an inactive state and the processor is capable of determining the state of the pair of sensors to determine the trend in the signals.

4. The device of claim 1 further comprising a signal conditioning circuit that is connected between the pair of sensors and the processor.

5. The device of claim 4 further comprising a circuit connected between the processor and one of the sensors, the circuit for operating the sensor to which it is connected.

6. The device of claim 1 wherein the pair of sensors comprises an optical pair of sensors.

7. The device of claim 1 wherein the pair of sensors comprises a pair of conducting contact pads.

8. A device for determining a level of objects in a hopper comprising:

a hopper for storing and dispensing objects;

a delivery mechanism for dispensing an object from the hopper, the delivery mechanism capable of attempting a dispensing of an object from the hopper;

a sensor for detecting whether an object has been dispensed from the hopper by the delivery mechanism; and a processor connected to the delivery mechanism and the sensor for determining the number of dispensing attempts that occur per object dispensed to determine if there is an increase in dispensing attempts, the processor for determining whether there is a trend upward which is indicative of the hopper becoming empty of objects to further indicate a low level condition.

9. The device of claim 8 wherein the processor is adapted to storing the number of dispensing attempts that occur per object dispensed by the delivery mechanism in a circular buffer.

10. The device of claim 8 wherein the processor is capable of determining when the of dispensing attempts that occur per object dispensed by the delivery mechanism is trending upward with a certain slope.

11. A device for determining a level of objects in a hopper comprising:

a hopper for storing and dispensing objects;

a delivery mechanism for dispensing an object from the hopper, the delivery mechanism having a motor; and a processor connected to the motor for sensing average current drawn by the motor as the delivery mechanism dispenses an object from the hopper, the processor for determining the level of objects within the hopper based upon tracking a trend in the average current drawn by the motor with a downward trend in the average current drawn being indicative of a low level of objects in the hopper.

12. The device of claim 11 wherein the average current drawn by the motor trends downward with fewer objects in the hopper.

13. The device of claim 11 wherein the average current drawn by the motor is higher when the hopper is full of objects.

14. A device for determining a level of objects in a hopper comprising:

a hopper for storing and dispensing objects;

a pair of sensors positioned within the hopper for sensing one or more of the objects within the hopper;

a delivery mechanism for dispensing an object from the hopper, the delivery mechanism having a motor;

a sensor for detecting when an object has been dispensed from the hopper by the delivery mechanism; and a processor connected to the pair of sensors for receiving signals indicative of the pair of sensors sensing one or more of the objects, the processor for determining the level of objects within the hopper based upon tracking a trend in the signals, the processor further connected to the delivery mechanism and the sensor for determining a number of deliveries per delivery attempted by the delivery mechanism, and the processor connected to the motor for sensing current drawn by the motor as the delivery mechanism dispenses an object from the hopper, the signals capable of transitioning between high frequency transitions and low frequency transitions and the processor is adapted to determining the trend in the signals based upon the high and low frequency transitions.

15. The device of claim 14 wherein the trend is a moving average which transitions to a minimum negative slope.

16. The device of claim 14 wherein the processor is adapted to storing the number of deliveries per delivery attempted by the delivery mechanism in a circular buffer.

17. The device of claim 16 wherein the processor is capable of determining when the number of deliveries per delivery attempted by the delivery mechanism is trending upward with a certain slope.

18. The device of claim 14 wherein the current drawn by the motor trends downward with fewer objects in the hopper.

* * * * *